(12) United States Patent
Wang et al.

(10) Patent No.: US 12,200,144 B2
(45) Date of Patent: Jan. 14, 2025

(54) METHOD FOR UPGRADING CERTIFICATE OF POS TERMINAL, SERVER, AND POS TERMINAL (71) Applicant: SHENZHEN ZOLON TECHNOLOGY CO., LTD., Guangdong (CN)

(72) Inventors: Chuanxi Wang, Guangdong (CN); Dong Zhou, Guangdong (CN); Zhenwei Sun, Guangdong (CN); Saifeng Deng, Guangdong (CN)

(73) Assignee: SHENZHEN ZOLON TECHNOLOGY CO., LTD., Guangdong (CN)

( * ) Notice: Subject to any disclaimer, the term of this patent is extended or adjusted under 35 U.S.C. 154(b) by 710 days.

(21) Appl. No.: 17/786,919

(22) PCT Filed: Nov. 7, 2019

(86) PCT No.: PCT/CN2019/116299
§ 371 (c)(1),
(2) Date: Jun. 17, 2022

(87) PCT Pub. No.: WO2020/134635
PCT Pub. Date: Jul. 2, 2020

(65) Prior Publication Data
US 2023/0353390 A1 Nov. 2, 2023

(30) Foreign Application Priority Data
Dec. 28, 2018 (CN) .......................... 201811619935.2

(51) Int. Cl.
H04L 9/32 (2006.01)
G06Q 20/20 (2012.01)

(52) U.S. Cl.
CPC ........... *H04L 9/3268* (2013.01); *G06Q 20/20* (2013.01); *H04L 9/3273* (2013.01)

(58) Field of Classification Search
CPC ...... H04L 9/3268; H04L 9/3273; G06Q 20/20
See application file for complete search history.

(56) References Cited

U.S. PATENT DOCUMENTS 9,948,624 B2 * 4/2018 Su ........................ H04L 9/0836
11,443,293 B2 * 9/2022 Cheng ................... H04L 9/3263
(Continued)

FOREIGN PATENT DOCUMENTS

| CN | 101483866 A | 7/2009 |
| CN | 102064939 A | 5/2011 |

(Continued)

OTHER PUBLICATIONS

English Translation of Written Opinion for International Application No. PCT/CN2019/116299; Date of Completion: Jan. 20, 2020; Date of Mailing: Feb. 1, 2020; 4 Pages.
(Continued)

*Primary Examiner* — Viral S Lakhia
(74) *Attorney, Agent, or Firm* — CANTOR COLBURN LLP (57) ABSTRACT A method for upgrading a certificate of a POS terminal, a server, a POS terminal and a terminal device are provided, this method includes: performing a mutual authentication with the POS terminal when receiving a certificate upgrading request sent from the POS terminal; and encapsulating the certificate to be upgraded in a preset proprietary protocol format to obtain update data, using a session key to encrypt the update data to obtain a ciphertext and sending the ciphertext to the POS terminal, after the mutual authentication is passed. According to the present application, a problem that it is inconvenient to use the existing certificate (Continued)

Perform a mutual authentication with the POS terminal when receiving a certificate update request sent from the POS terminal — S101

Encapsulate a certificate-to-be-upgraded in a preset private protocol format to obtain update data, use a session key to encrypt the update data to obtain a ciphertext and send the ciphertext to the POS terminal, after the mutual authentication is passed — S102 update methods, much time needs to be consumed, and transportation cost is increased may be solved.

5 Claims, 2 Drawing Sheets

(56) References Cited

U.S. PATENT DOCUMENTS

| | | | |
|---|---|---|---|
| 11,514,419 B2* | 11/2022 | Jung | G06F 21/629 |
| 2007/0286373 A1* | 12/2007 | Pailles | H04W 12/03 |
| | | | 379/142.03 |
| 2014/0289130 A1* | 9/2014 | Savolainen | G06Q 20/3221 |
| | | | 705/71 |
| 2015/0106217 A1* | 4/2015 | Radu | G06Q 20/3227 |
| | | | 705/21 |
| 2016/0063466 A1* | 3/2016 | Sheridan | G06Q 20/1235 |
| | | | 705/26.25 |
| 2016/0321638 A1 | 11/2016 | Cheng et al. | |
| 2016/0364723 A1* | 12/2016 | Reese | G06Q 20/202 |
| 2018/0276664 A1* | 9/2018 | Peng | G06Q 20/206 |
| 2019/0394053 A1 | 12/2019 | Yu et al. | |
| 2021/0157922 A1* | 5/2021 | Chen | G06F 21/577 |

FOREIGN PATENT DOCUMENTS

| | | |
|---|---|---|
| CN | 104700261 A | 6/2015 |
| CN | 107769924 A | 3/2018 |
| CN | 108306853 A | 7/2018 |
| CN | 109743176 A | 5/2019 |
| IN | 108270568 A | 7/2018 |
| WO | 2018145547 A1 | 8/2018 |

OTHER PUBLICATIONS

International Preliminary Report on Patentability for International Application No. PCT/CN2019/116299; Date of Issuance: Jun. 16, 2021; 5 Pages.
International Search Report for International Application No. PCT/CN2019/116299; Date of Completion: Jan. 20, 2020; Date of Mailing: Feb. 1, 2020; 3 Pages.
Translation of International Search Report for International Application No. PCT/CN2019/116299; Date of Completion: Jan. 20, 2020; Date of Mailing: Feb. 1, 2020; 2 Pages.
Written Opinion for International Application No. PCT/CN2019/116299; Date of Completion: Jan. 20, 2020; Date of Mailing: Feb. 1, 2020; 4 Pages.

* cited by examiner

FIG. 3

METHOD FOR UPGRADING CERTIFICATE OF POS TERMINAL, SERVER, AND POS TERMINAL

CROSS-REFERENCE TO RELATED APPLICATIONS

This application is the PCT International Application No. PCT/CN2019/116299 for entry into US national phase, with an International filing date of Nov. 7, 2019 designating the USA, which claims priority to Chinese patent application No. 201811619935.2 filed on Dec. 28, 2018, and entitled "method for upgrading certificate of POS terminal, server and POS terminal", the contents each of which are incorporated herein by reference in entirety.

TECHNICAL FIELD

The present application relates to the field of digital interactive technology, and particularly relates to a method for upgrading certificate of POS terminal, a server and a POS terminal.

BACKGROUND

With the development of the industry of payment, POS (Point of Sale) terminals are widely used in various business places. There are three levels of certificates in the existing POS terminal, that is, a root certificate, an agent certificate (POS-terminal-secondary-certificate) and a terminal certificate (POS-terminal-tertiary-certificate), where the root certificate is issued by the authoritative CA (Certificate Authority).

Due to the fact that the root certificate has a certain validity period, so that the three levels of certificates in the POS machine needs to be upgraded before the root certificate is about to expire. The existing certificate upgrading method is to transport the POS terminal into a security room of a POS manufacturer where the certificate of the POS terminal is upgraded, although this certificate upgrading method can ensure the security of the certificate upgrading process, much transportation time needs to be consumed, and the transportation cost is increased accordingly.

As stated above, it is inconvenient to use the existing certificate upgrading method, much time needs to be consumed, and the transportation cost is increased.

SUMMARY

In view of this, the present application provides a method for upgrading certificate of POS terminal, a server, a POS terminal and a terminal device, which aim to solve the problem that it is inconvenient to use the existing certificate upgrading method, much time needs to be consumed, and transportation cost is increased.

In the first aspect, a method for upgrading a certificate of a POS terminal is provided in one embodiment of the present application, this method is implemented by a server and includes:

performing, by the server, a mutual authentication with the POS terminal when receiving a request for upgrading the certificate sent from the POS terminal; and encapsulating a certificate-to-be-upgraded in a preset proprietary protocol format to obtain updated data, using a session key to encrypt the updated data to obtain a ciphertext and sending the ciphertext to the POS terminal by the server, after the mutual authentication is passed.

In the second aspect, another method for upgrading a certificate of a POS terminal is provided in one embodiment of the present application, this method is implemented by the POS terminal and includes:

sending a request for upgrading the certificate to a server and performing a mutual authentication with the server by the POS terminal; and receiving a ciphertext sent from the server, using a session key to decrypt the ciphertext to obtain updated data, extracting a certificate-to-be-upgraded from the updated data and replacing an old certificate with the certificate-to-be-upgraded by the POS terminal, after the mutual authentication is passed.

In the third aspect, a terminal device is provided in one embodiment of the present application, the terminal device includes a memory, a processor, and a computer program stored in the memory and executable on the processor, the processor is configured to, when executing the computer program, implement steps of a method for upgrading a certificate of a POS terminal, including:

performing a mutual authentication with the POS terminal when receiving a request for upgrading the certificate sent from the POS terminal; and encapsulating a certificate-to-be-upgraded in a preset proprietary protocol format to obtain updated data, using a session key to encrypt the updated data to obtain a ciphertext and sending the ciphertext to the POS terminal, after the mutual authentication is passed.

In the fourth aspect, a computer readable storage medium is provided in one embodiment of the present application, the computer readable storage medium stores a computer program, that, when executed by a processor of a server, causes the processor to implement the steps in the method for upgrading the certificate of the POS terminal.

In the method for updating the certificate of the POS terminal disclosed in the present application, firstly, the server performs the mutual authentication with the POS terminal, and then upgrades the certificate after the mutual authentication between the POS terminal and the server is passed, in the upgrading process of the certificate, the server encapsulates the certificate-to-be-upgraded in the preset proprietary protocol format, obtains updated data, encrypts the updated data according to the session key, and sends the encrypted updated data to the POS terminal. Due to the fact that the safety of communication between the POS terminal and the server is guaranteed according to the proprietary protocol and the session key, the POS terminal does not need to return an upgraded certificate in the security room. The POS terminal can safely update the certificate on line, thereby solving a problem that it is inconvenient to use the existing certificate updating methods, much time needs to be consumed, and a transportation cost is increased.

BRIEF DESCRIPTION OF THE DRAWINGS

In order to explain the technical solution in the embodiments of the present application, a brief introduction regarding the accompanying drawings that need to be used for describing the embodiments or the prior art is given below; it is obvious that the accompanying drawings described below are only some embodiments of the present application, a person of ordinary skill in the art may also obtain other drawings according to the current drawings without paying creative labor.

DESCRIPTION OF THE EMBODIMENTS

In the following descriptions, in order to describe but not intended to limit the present application, concrete details such as specific system structure, technique, and the like are proposed, so that a comprehensive understanding of the embodiments of the present application is facilitated.

In order to describe the technical solutions of the present application, the technical solutions of the present application are described with reference to the embodiments below:

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should also be understood that, terms used in the description of the present application are for the purpose of describing specific embodiments but not intended to limit the present application. As is used in the description and the annexed claims of the present application, unless other conditions are indicated clearly in the context, otherwise, singular forms of terms such as "a", "one", "the" are intended to include plural forms.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Moreover, in the descriptions of the present application, terms such as "first" and "second", etc., are only intended to be distinguished in description, but shouldn't be interpreted as indicating or implying a relative importance.

In the embodiments of the present application, three levels of certificates are stored in a POS (Point of Sale) terminal, the three levels of certificates are root certificate, agent certificate (i.e., POS-terminal-secondary-certificate), and terminal certificate (i.e., POS-terminal-tertiary-certificate).

The root certificate, the POS-terminal-secondary-certificate and a server-secondary-certificate are generated and issued to the server by a CA (Certificate Authority), the server sends the root certificate and the POS-terminal-secondary-certificate to the POS terminal, and the POS-terminal-tertiary-certificate is generated by the server and is sent to the POS terminal.

A root-certificate-private-key corresponding to the root certificate is stored by the CA.

A first preset key generation algorithm may be selected according to actual requirement, for example, an RSA algorithm may be selected to generate an RSA key pair.

Embodiment One

Figure 1:
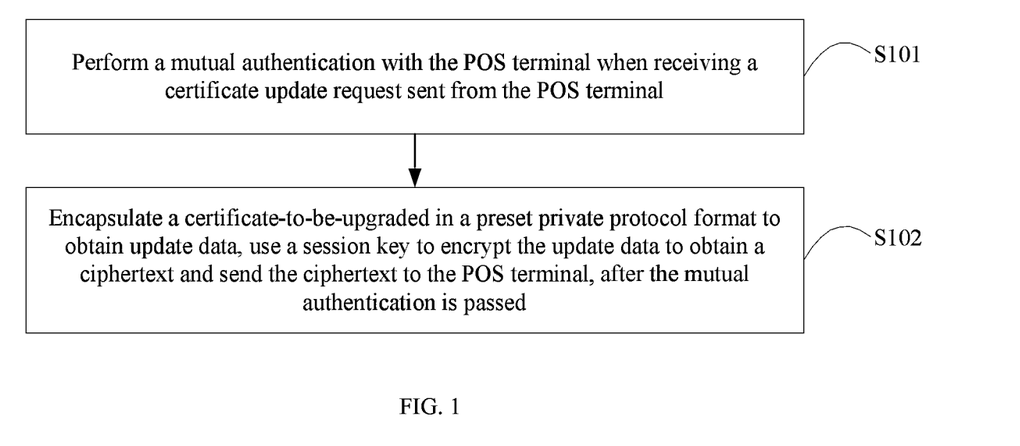
FIG. 1 is a schematic implementation process of one method for upgrading a certificate of a POS terminal according to embodiment one of the present application.

A method for updating a certificate of a POS terminal according to embodiment one of the present application is described below with reference to FIG. 1, and this method for upgrading the certificate of the POS terminal is implemented by a server and includes:

At step S101, a mutual authentication is performed with the POS terminal when a request for upgrading the certificate sent from a POS terminal is received;

when the certificate of the POS terminal needs to be upgraded, the POS terminal sends the request for upgrading the certificate to the server.

When the request for upgrading the certificate sent from the POS terminal is received by the server, the server performs the mutual authentication with the POS terminal, upgrading of the certificate is started if the mutual authentication is passed, upgrading process of the certificate is terminated if the mutual authentication is failed.

At step S102, after the mutual authentication is passed, the certificate-to-be-upgraded in the preset proprietary protocol format is encapsulated to obtain updated data, the updated data is encrypted to obtain a ciphertext according to the session key, and the ciphertext is sent to the POS terminal.

After the mutual authentication is passed, for the security and the privacy of communication between the server and the POS terminal, the certificate-to-be-upgraded may be encapsulated using the proprietary protocol format to obtain updated data, and the updated data is encrypted using the session key to obtain the ciphertext before the updated data is sent to the POS terminal, and the ciphertext is sent to the POS terminal, so that the security and the privacy of the communication are ensured through the proprietary protocol format and the session key.

The format of delivery of the certificate is specified in the proprietary protocol format (e.g., the indicator of the start of the message, ID of message format, the number of frames and the length of message, the cyclic redundancy check code, etc.), in the upgrading process of the certificate, the content of the certificate needs to be encapsulated according to the proprietary protocol format.

For example, one example of private logic protocol is shown below:

[SOH] [ID] [FN] [LENGTH] [STX] [Applicative_message] [EOT] [CRC]

Where SOH represents a start indicator of a message with a memory space of 1 byte; ID represents ID of a message format with a memory space of 1 byte; FN represents a number of frames, serial number of the message with a memory space of 1 byte; LENGTH represents the length of the message with a memory space of 2 bytes; STX represents the beginning of a header of the message with a memory space of 1 byte; Applicative_message represents a message of ISO8583 format; EOT represents application information end indicator with a memory space of 1 byte; and CRC represents cyclic redundancy check code with a memory space of 2 bytes. The CRC may be obtained through a general algorithm, and has a fixed memory space of 2 bytes, and the CRC may authenticate the integrity and the validity of the format and the content of the message, avoid information from being tampered, the rest of the information is fixed content.

In the process of transmitting the ciphertext from the server to the POS terminal, data transmission may be performed through a TCP/IP (Transmission Control Protocol/Internet Protocol) protocol.

After the ciphertext is received by the POS terminal, the POS terminal uses the session key to decrypt the ciphertext to obtain updated data, extracts the certificate-to-be-upgraded in the updated data, and replaces the old certificate with the certificate-to-be-upgraded to complete a certificate upgrading and injection process of the POS terminal.

In one embodiment, the step of performing the mutual authentication with the POS terminal when receiving the request for upgrading the certificate sent from the POS terminal includes:

At step A1, a server-secondary-certificate and a server-random-number are sent to the POS terminal when a request for upgrading the certificate sent from the POS terminal is received, where the server-secondary-certificate and the POS-terminal-secondary-certificate are obtained by signing a root-certificate-private-key corresponding to the same root certificate.

When the server performs mutual authentication with the POS terminal, identity authentication and handshake may be performed through the three levels of certificates in the POS terminal and the server-secondary-certificate of the server.

When the mutual authentication are performed, the POS terminal sends a request for upgrading the certificate to the server.

The server receives the request for upgrading the certificate sent from the POS terminal, and sends the server-secondary-certificate and the server-random-number to the POS terminal.

The POS terminal may use the root certificate to authenticate a signature of the server-secondary-certificate to obtain a server-secondary-public-key, the POS terminal signs the server-random-number using the POS-terminal-tertiary-private-key, and sends the POS-terminal-secondary-certificate, the POS-terminal-tertiary-certificate, the POS-terminal-random-number, and the server-random-number signed by the POS-terminal-tertiary-private-key to the server.

At step A2, the POS-terminal-secondary-certificate, the POS-terminal-tertiary-certificate, the POS-terminal-random-number and the server-random-number signed by the POS-terminal-tertiary-private-key, which are returned by the POS terminal, are received;

At step A3, the root certificate is used to authenticate a signature of the POS-terminal-secondary-certificate to obtain a POS-terminal-secondary-public-key, and using the POS-terminal-secondary-public-key to authenticate a signature of the POS-terminal-tertiary-certificate to obtain a POS-terminal-tertiary-public-key;

At step A4, the POS-terminal-tertiary-public-key is used to authenticate a signature of the server-random-number signed by the POS-terminal-tertiary-private-key to obtain a verification result from the server, and determine whether the verification result from the server is consistent with the server-random-number;

if the verification result from the server is consistent with the server-random-number, it indicates that the authentication of the POS terminal is passed; if the verification result from the server is inconsistent with the server-random-number, it indicates that the authentication of the POS terminal is failed, and the certificate upgrading process is terminated.

At step A5, the POS-terminal-random-number signed by the server-secondary-private-key is sent to the POS terminal when the verification result from the server is consistent with the server-random-number.

When the verification result from the server is consistent with the server-random-number, the server uses the server-secondary-private-key to sign the POS-terminal-random-number and sends the POS-terminal-random-number signed by the server-secondary-private-key to the POS terminal.

After receiving the POS-terminal-random-number signed by the server-secondary-private-key, the POS terminal uses the server-secondary-public-key to authenticate the POS-terminal-random-number signed by the server-secondary-private-key to obtain the verification result from the POS terminal, and the signature authentication is passed if the verification result from the POS terminal is consistent with the POS-terminal-random-number, it indicates that the authentication of the server is successful, first success information is returned to the server; if the verification result from the POS terminal is inconsistent with the POS-terminal-random-number, the signature authentication is failed, it indicates that the authentication of the server is failed, first failure information is returned to the server, and the certificate upgrading process is terminated.

At step A6, the mutual authentication is passed when receiving the first success information returned by the POS terminal after the POS-terminal-random-number signature signed by the server-secondary-private-key is successfully authenticated by the POS terminal by using the server-secondary-certificate.

In one embodiment, before the step of encapsulating the certificate-to-be-upgraded in the preset proprietary protocol format to obtain updated data, using the session key to encrypt the updated data, and sending the encrypted updated data to the POS terminal after the mutual authentication is passed, the method further includes:

At step B1, the session key is generated by the server by negotiating with the POS terminal.

The session key may be a preset fixed key, or be a key generated by temporary negotiation in a connection process between the server and the POS terminal.

When the server negotiates with the POS terminal to generate the session key, the negotiation process may be set according to the actual situation, an example of a negotiation process of the session key is described below:

The server uses the random number to generate a session key factor, by using a preset symmetric encryption algorithm (e.g., a triple data encryption algorithm) to calculate a check bit of the session key factor, uses the server-secondary-private-key to sign the check bit of the session key factor, uses the POS-terminal-tertiary-public-key to encrypt the session key factor, and sends the check bit of the session key factor signed by the server-secondary-private-key and the session key factor encrypted by the POS-terminal-tertiary-public-key to the POS terminal.

After receiving the check bit of the session key factor signed by the server-secondary-private-key and the session key factor encrypted by the POS-terminal-tertiary-public-key, the server-secondary-public-key is used to authenticate the check bit of the session key factor signed by the server-secondary-private-key to obtain the check bit of the session key factor, and the POS-terminal-tertiary-private-key is used to decrypt the session key factor encrypted by the POS-terminal-tertiary-public-key to obtain the session key factor.

The POS mobile terminal uses the check bit of the session key factor to authenticate a validity of the session key factor, information indicative of successful authentication is sent to the server, and the negotiation process of the session key is completed if the authentication of the validity of the session key factor is passed; information indicative of failed authentication is sent to the server, and the negotiation process is performed again or the certificate upgrading process of the session key is terminated if the authentication of the validity of the session key factor is failed.

After the session key is generated, the session key may be used to encrypt the data information generated due to interaction between the POS terminal and the server, and the symmetric encryption algorithm used for encryption may be selected according to actual needs, for example, the 3DES (i.e., triple data encryption algorithm) may be selected to encrypt the data information.

In one embodiment, the certificate-to-be-upgraded includes a new-root-certificate, a new-secondary-certificate, and a new-tertiary-certificate, and said encapsulating the certificate-to-be-upgraded in the preset proprietary protocol format to obtain updated data, using the session key to encrypt the updated data, and sending the encrypted updated data to the POS terminal after the mutual authentication is passed includes:

At step C1, after the mutual authentication is passed, the new-root-certificate in the preset proprietary protocol format is encapsulated to obtain root-certificate-update-data, the root-certificate-update-data is encrypted according to the session key and a first ciphertext is obtained, and the first ciphertext is sent to the POS terminal;

After receiving the first ciphertext, the POS terminal uses the session key to decrypt the first ciphertext to obtain the root-certificate-update-data, extracts a new-root-certificate from the root-certificate-update-data, and sends the second success information to the server.

At step C2, when receiving the second success information returned by the POS terminal by the server, the new-secondary-certificate is encapsulated by the server in the preset proprietary protocol format to obtain secondary-certificate-update-data, the secondary-certificate-update-data is encrypted by the server by using the session key to obtain a second ciphertext, and the second ciphertext is sent from the server to the POS terminal, where the second success information is the information returned by the POS terminal after the POS terminal decrypts the first ciphertext using the session key and extracts the new-root-certificate from the deciphered first ciphertext.

When receiving the second ciphertext, the POS terminal decrypts the second ciphertext by using the session key to obtain the secondary-certificate-update-data, extracts a new-secondary-certificate in the secondary-certificate-update-data, verifies the new-secondary-certificate by using the new-root-certificate public key, and returns the third success information to the server if the new-secondary-certificate is verified.

At step C3, when receiving the third success information returned by the POS terminal by the server, the new-tertiary-certificate is encapsulated by the server by using the preset proprietary protocol format to obtain tertiary-certificate-update-data, tertiary-certificate-update-data is encrypted according to the session key to obtain a third ciphertext, the third ciphertext is deciphered by using the session key, the third ciphertext is sent to the POS terminal, so that the POS terminal uses the session key to decrypt the third ciphertext and extract the new-tertiary-certificate from the deciphered third ciphertext; where the third success information is the information returned by the POS terminal after the POS terminal uses the session key to decrypt the second ciphertext, and extracts the new-secondary-certificate from the deciphered second ciphertext, and successfully verifies the signature of the new-secondary-certificate using the new-root-certificate public key.

When the third ciphertext is received by the POS terminal, the POS mobile terminal uses the session key to decrypt the third ciphertext to obtain the tertiary-certificate-update-data, and extract the new-tertiary-certificate from the tertiary-certificate-update-data.

When the POS mobile terminal uses the new-root-certificate public key to authenticate the new-secondary-certificate, a new-secondary-certificate public key may be obtained.

The POS terminal uses the new-secondary-certificate public key to authenticate the new-tertiary-certificate, and completes the receipt of the three levels of certificates of the POS terminal; the POS terminal may send fourth success information to the server and disconnect the connection with the server, use the new-root-certificate, the new-secondary-certificate and the new-tertiary-certificate to replace the corresponding old certificates to complete upgrading of the certificates.

After receiving the fourth success information, the server disconnects the connection with the POS terminal, and stores a certificate injection result into the database.

In the method for updating the certificate of the POS terminal disclosed in this embodiment, firstly, the server performs the mutual authentication with the POS terminal, and then upgrades the certificate after the mutual authentication between the POS terminal and the server is passed, in the upgrading process of the certificate, the server encapsulates the certificate-to-be-upgraded in the preset proprietary protocol format, obtains updated data, encrypts the updated data according to the session key, and sends the encrypted updated data to the POS terminal. Due to the fact that the safety of communication between the POS terminal and the server is guaranteed according to the proprietary protocol and the session key, the POS terminal does not need to return an upgraded certificate in the security room. The POS terminal can safely update the certificate on line, thereby solving a problem that it is inconvenient to use the existing certificate updating method, much time needs to be consumed, and a transportation cost is increased.

When the mutual authentication between the server and the POS terminal is performed, the existing certificate of the POS terminal may be used to perform an authentication and handshake with the server, and a new certificate need not to be introduced for the POS terminal.

It should be understood that, the values of serial numbers of the steps in the aforesaid embodiments do not indicate a sequencing of execution sequences of the steps; instead, the execution sequences of the steps should be determined by functionalities and internal logic of the steps, and the execution sequences of the steps shouldn't be regarded as limitation to an implementation process of this embodiment of the present application.

Embodiment Two

Figure 2:
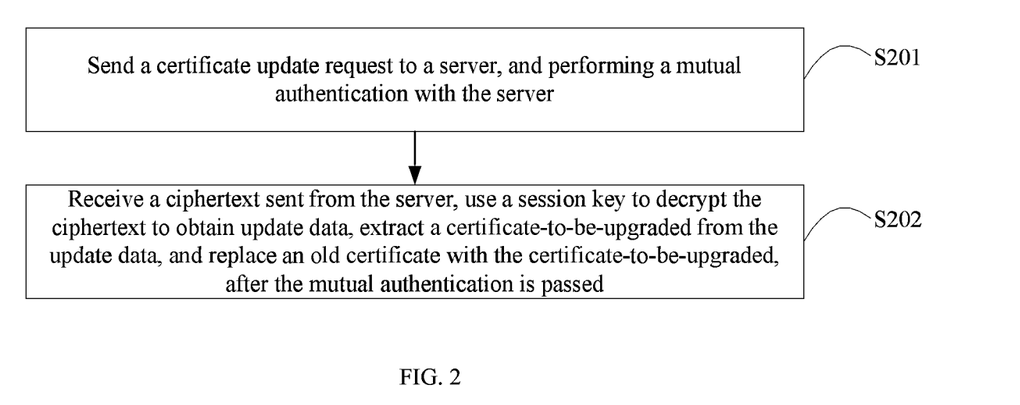
FIG. 2 is a schematic implementation process of another method for upgrading the certificate of the POS terminal according to embodiment two of the present application.

Another method for updating a certificate of a POS terminal disclosed in embodiment two of the present application is described below, with reference to FIG. 2, the method for upgrading the certificate of the POS terminal in Embodiment two of the present application includes:

At step S201, a request for upgrading the certificate is sent to the server, and a mutual authentication between the POS terminal and the server is performed.

When the certificate of the POS terminal needs to upgraded, the POS terminal sends a request for upgrading the certificate to the server.

When the server receives the request for upgrading the certificate sent from the POS terminal, the POS terminal performs the mutual authentication with the server, if the mutual authentication is passed, a certificate injection and upgrading process is performed; if the mutual authentication is failed, the certificate injection and upgrading process is terminated.

A format of delivery of certificate is specified in a proprietary protocol format (e.g., an indicator of a start of a message, an ID of a message format, a number of frames, and a length of the message, a cyclic redundancy check code, etc.), in the upgrading process of the certificate, the content of the certificate needs to be encapsulated according to the proprietary protocol format.

For example, one example of private logic protocol is shown below:

[SOH] [ID] [FN] [LENGTH] [STX] [APPLIED_MESSAGE] [EOT] [CRC]

Where SOH represents a start indicator of a message with a memory space of 1 byte; ID represents ID of a message format with a memory space of 1 byte; FN represents a number of frames, serial number of the message with a memory space of 1 byte; LENGTH represents the length of the message with a memory space of 2 bytes; STX represents the beginning of a header of the message with a memory space of 1 byte; Applicative_message represents a message of ISO8583 format; EOT represents application information end indicator with a memory space of 1 byte; and CRC represents cyclic redundancy check code with a memory space of 2 bytes. The CRC may be obtained through a general algorithm, and has a fixed memory space of 2 bytes, and the CRC may authenticate the integrity and the validity of the format and the content of the message, avoid information from being tampered, the rest of the information is fixed content.

In the process of transmitting the ciphertext from the server to the POS terminal, data transmission may be performed through the TCP/IP protocol.

At step S202, after the mutual authentication is passed, a ciphertext sent from the server is received, the ciphertext is deciphered according to the session key, and updated data is obtained, a certificate-to-be-upgraded is extracted from the updated data, and the old certificate is replaced with the certificate-to-be-upgraded.

After the mutual authentication is passed, for the security and the privacy of communication between the server and the POS terminal, the certificate-to-be-upgraded may be encapsulated by using the proprietary protocol format to obtain the updated data, and the updated data is deciphered by using the session key to obtain the ciphertext, when receiving the ciphertext, the POS terminal decrypts the ciphertext according to the session key to obtain the updated data, extracts the certificate-to-be-upgraded from the updated data and replaces the old certificate with the certificate-to-be-upgraded, thereby completing the certificate injection and upgrading process of the POS terminal.

In one embodiment, said sending the request for upgrading the certificate to the server, and performing the mutual authentication with the server includes:

At step D1, the request for upgrading the certificate is sent to the server, and a server-secondary-certificate and a server-random-number returned by the server is received; where the server-secondary-certificate and the POS-terminal-secondary-certificate are obtained by signing a root-certificate-private-key corresponding to the same root certificate;

At step D2, the POS-terminal-secondary-certificate, the POS-terminal-tertiary-certificate, the POS-terminal-random-number, and the server-random-number signed by the POS-terminal-tertiary-private-key are sent to the server;

The server uses the root certificate to authenticate a signature of the POS-terminal-secondary-certificate to obtain a POS-terminal-secondary-public-key, and uses the POS-terminal-secondary-public-key to authenticate a signature of the POS-terminal-tertiary-certificate to obtain a POS-terminal-tertiary-public-key.

The server uses the POS-terminal-tertiary-public-key to authenticate the server-random-number signed by the POS-terminal-tertiary-private-key to obtain a verification result from the server, and determines whether the verification result from the server is consistent with the server-random-number.

When the verification result from the server is consistent with the server-random-number, the server sends the POS-terminal-random-number signed by the server-secondary-private-key to the POS terminal.

At step D3, the POS-terminal-random-number signed by the server-secondary-private-key and returned by the server is received by the POS terminal after the server uses the POS-terminal-secondary-certificate and the POS-terminal-tertiary-certificate to successfully authenticate the server-random-number signature signed by the POS-terminal-tertiary-private-key;

At step D4, a root certificate is used to authenticate a signature of the server-secondary-certificate to obtain a server-secondary-public-key;

At step D5, the server-secondary-public-key is used to authenticate a signature of the POS-terminal-random-number signed by the server-secondary-private-key to obtain a verification result from the POS terminal, and whether the verification result from the POS terminal is consistent with the POS-terminal-random-number is determined;

At step D6, when the verification result from the POS terminal is consistent with the POS-terminal-random-number, first success information is sent to the server, and the mutual authentication is passed.

In one embodiment, after the mutual authentication is passed, and before the ciphertext sent from the server is received, the ciphertext is deciphered according to the session key and the updated data is obtained, the certificate-to-be-upgraded in the updated data is extracted, and the old certificate is replaced with the certificate-to-be-upgraded, the method further includes:

At step E1, the POS terminal negotiates with the server to generate a session key.

The session key may be a preset fixed key, or be a key generated through temporary negotiation between the POS terminal and the server during a connection process.

When the POS terminal negotiates with the server to generate the session key, the negotiation process may be set according to the actual situation, and an example of a session key negotiation process is described below:

The server uses the random number to generate a session key factor, by using a preset symmetric encryption algorithm (e.g., a triple data encryption algorithm) to calculate a check bit of the session key factor, uses the server-secondary-private-key to sign the check bit of the session key factor, uses the POS-terminal-tertiary-public-key to encrypt the session key factor, and sends the check bit of the session key factor signed by the server-secondary-private-key and the session key factor encrypted by the POS-terminal-tertiary-public-key to the POS terminal.

After receiving the check bit of the session key factor signed by the server-secondary-private-key and the session key factor encrypted by the POS-terminal-tertiary-public-key, the server-secondary-public-key is used to authenticate the check bit of the session key factor signed by the server-secondary-private-key to obtain the check bit of the session key factor, and the POS-terminal-tertiary-private-key is used to decrypt the session key factor encrypted by the POS-terminal-tertiary-public-key to obtain the session key factor.

The POS mobile terminal uses the check bit of the session key factor to authenticate a validity of the session key factor, information indicative of successful authentication is sent to the server, and the negotiation process of the session key is completed if the authentication of the validity of the session key factor is passed; information indicative of failed authentication is sent to the server, and the negotiation process is performed again or the certificate upgrading process of the session key is terminated if the authentication of the validity of the session key factor is failed.

After the session key is generated, the session key may be used to encrypt the data information generated due to interaction between the POS terminal and the server, and the symmetric encryption algorithm used for encryption may be selected according to actual needs, for example, the 3DES (i.e., triple data encryption algorithm) may be selected to encrypt the data information.

In one embodiment, the certificate-to-be-upgraded includes a new-root-certificate, a new-secondary-certificate, and a new-tertiary-certificate; after the mutual authentication is passed, a step of receiving the ciphertext sent from the server, decrypting the ciphertext according to the session key to obtain updated data, extracting the certificate-to-be-upgraded from the updated data, and replacing the old certificate with the certificate-to-be-upgraded includes:

At step F1, after the mutual authentication is passed, a first ciphertext sent from the server is received, the first ciphertext is deciphered by using the session key and root-certificate-update-data is obtained, the new-root-certificate is extracted from the root-certificate-update-data, and second success information is returned to the server;

Where the root-certificate-update-data is obtained by the server by using a preset proprietary protocol format to encapsulate the new-root-certificate, and the first ciphertext is obtained by the server by using the session key to encrypt the root-certificate-update-data.

When the server receives the second success information returned by the POS terminal, the server encapsulates the new-secondary-certificate in the preset proprietary protocol format to obtain secondary-certificate-update-data, encrypts the secondary-certificate-update-data according to the session key to obtain the second ciphertext, and sends the second ciphertext to the POS terminal.

At step F2, a second ciphertext sent from the server is received by the POS terminal, the second ciphertext is deciphered by the POS terminal by using the session key and secondary-certificate-update-data is obtained, a new-secondary-certificate is extracted from the secondary-certificate-update-data, the new-secondary-certificate is verified by using the new-root-certificate public key, and third success information is sent to the server if authentication of the new-secondary-certificate is successful;

When the POS mobile terminal uses the new-root-certificate public key to authenticate the new-secondary-certificate, a new-secondary-certificate public key may be obtained.

When the server receives the third success information returned by the POS terminal after the POS terminal has verified the new-secondary-certificate by using the new-root-certificate public key, the sever uses the preset proprietary protocol format to encapsulate the new-tertiary-certificate to obtain tertiary-certificate-update-data, encrypts the tertiary-certificate-update-data according to the session key to obtain a third ciphertext, and sends the third ciphertext to the POS terminal.

At step F3, the third ciphertext sent from the server is received by the POS terminal, the session key is used to encrypt the third ciphertext to obtain tertiary-certificate-update-data, a new-tertiary-certificate is extracted from the tertiary-certificate-update-data, the new-secondary-certificate public key is used to authenticate the new-tertiary-certificate; after authentication of the new-tertiary-certificate is passed, the new-root-certificate, the new-secondary-certificate and the new-tertiary-certificate are used to replace the old root certificate, the old POS-terminal-secondary-certificate, and the old POS-terminal-tertiary-certificate, respectively.

The POS terminal may send fourth success information to the server and disconnect the connection with the server, and after the fourth success information is received, the server disconnects the connection with the POS terminal, and stores a certificate injection result into a database.

In the method for updating the certificate of the POS terminal disclosed in this embodiment, the mutual authentication between the POS terminal and the server is performed, the POS terminal encapsulates the certificate-to-be-upgraded in the preset proprietary protocol format to obtain the updated data, encrypts the updated data according to the session key, and sends the encrypted updated data to the POS terminal. Due to the fact that the safety of communication is guaranteed through the proprietary protocol and the session key, the POS terminal does not need to return a security room update certificate. The POS terminal may safely update the certificate on line, thereby solving a problem that it is inconvenient to use the existing certificate upgrading methods, much time needs to be consumed, and a cost of transportation is increased.

When the mutual authentication between the POS terminal and the server is performed, an existing certificate of the POS terminal may be used to perform authentication and handshake with the server, so that a new certificate need not to be introduced for the POS terminal.

When the certificate injection update process is performed, every time when the POS terminal receives a next-level certificate, the POS terminal uses the received last-level certificate to verify the next-level certificate to ensure that the received certificate is correct, so that the upgrading process of the three-levels of certificates in the POS terminal is completed after certificate authentication is passed.

It should be understood that, the values of serial numbers of the steps in the aforesaid embodiments do not indicate a sequencing of execution sequences of the steps; instead, the execution sequences of the steps should be determined by functionalities and internal logic of the steps, and the execution sequences of the steps shouldn't be regarded as limitation to an implementation process of this embodiment of the present application.

Embodiment Three

Figure 3:
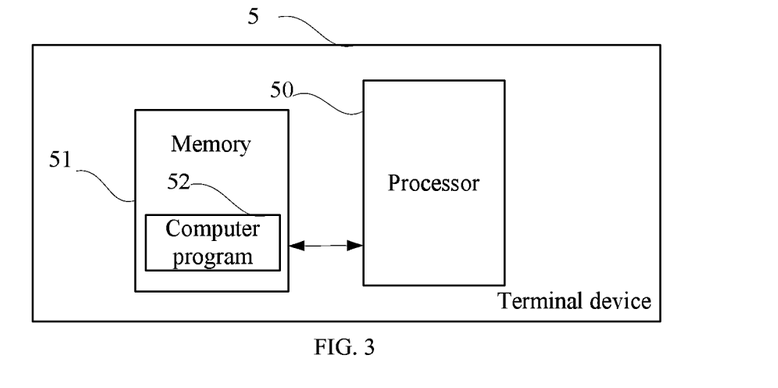
FIG. 3 is a schematic block diagram of a terminal device according to embodiment three of the present application.

FIG. 3 is a schematic diagram of a terminal device provided by embodiment five of the present application, as shown in FIG. 3, the terminal device 5 in this embodiment includes: a processor 50, a memory 51 and a computer program 52 stored in the memory 51 and executable by the processor 50. When the computer program 52 is executed by the processor 50, the processor 50 is configured to implement the steps (e.g., the step S101 and the step S102 as shown in FIG. 1) in the method for upgrading certificate of POS terminal in the method embodiments.

The terminal device 5 can be a computing device such as a desktop computer, a laptop computer, a palm computer, a cloud server, etc. The terminal device 5 can include but is not limited to: the processor 50 and the memory 51. A person of ordinary skill in the art can understand that, FIG. 3 is only one example of the terminal device 5, but should not be constituted as limitation to the terminal device 5, more or less components than the components shown in FIG. 3 may be included, as an alternative, some components or different components may be combined; for example, the terminal device 5 may also include an input and output device, a network access device, a bus, etc.

The so-called processor 50 may be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor can also be any conventional processor, and the like.

The memory 51 may be an internal storage unit of the terminal device 5, such as a hard disk or a memory of the terminal device 5. The memory 51 may also be an external storage device of the terminal device 5, such as a plug-in hard disk, a SMC (Smart Media Card), a SD (Secure Digital) card, a FC (Flash Card) equipped on the terminal device 5. In one embodiment, the memory 51 may not only include the internal storage unit of the terminal device 5, but also include the external memory of the terminal device 5. The memory 51 is configured to store the computer program, and other procedures and data needed by the terminal device 5. The memory 51 can also be configured to store data that has been output or being ready to be output temporarily.

The embodiments described above are only intended to explain but not to limit the technical solutions of the present application. Although the present application has been explained in detail with reference to these embodiments, a person of ordinary skilled in the art can understand that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A method for updating a certificate of a point of sale (POS) terminal implemented by a server, comprising:
    performing, by the server, a mutual authentication with the POS terminal when receiving a request for upgrading the certificate sent from the POS terminal; and
    encapsulating a certificate-to-be-upgraded in a preset proprietary protocol format to obtain updated data, using a session key to encrypt the updated data to obtain a ciphertext and sending the ciphertext to the POS terminal by the server, after the mutual authentication is passed;
    wherein said performing, by the server, the mutual authentication with the POS terminal when receiving the request for upgrading the certificate sent from the POS terminal comprises:
    sending a server-secondary-certificate and a server-random-number to the POS terminal by the server when the request for upgrading the certificate sent from the POS terminal is received; wherein the server-secondary-certificate and a POS-terminal-secondary-certificate are obtained by signing a root-certificate-private-key of a root certificate; and
    receiving, by the server, the POS-terminal-secondary-certificate, a POS-terminal-tertiary-certificate, a POS-terminal-random-number, and the server-random-number signed by a POS-terminal-tertiary-private-key from the POS terminal;
    by the server, using the root certificate to authenticate a signature of the POS-terminal-secondary-certificate to obtain a POS-terminal-secondary-public-key, and using the POS-terminal-secondary-public-key to authenticate a signature of the POS-terminal-tertiary-certificate to obtain a POS-terminal-tertiary-public-key;
    by the server, using the POS-terminal-tertiary-public-key to authenticate a signature of the server-random-number signed by a POS-terminal-tertiary-private-key to obtain a verification result from the server, and determining whether the verification result from the server is consistent with the server-random-number;
    sending, by the server, the POS-terminal-random-number signed by a server-secondary-private-key to the POS terminal, when the verification result from the server is consistent with the server-random-number; and
    passing the mutual authentication by the server, when receiving first success information returned by the POS terminal after the POS terminal has successfully authenticated a signature of the POS-terminal-random-number signed by the server-secondary-private-key by using the server-secondary-certificate.

2. The method according to claim 1, wherein said encapsulating the certificate-to-be-upgraded in the preset proprietary protocol format to obtain updated data, using the session key to encrypt the updated data to obtain the ciphertext and sending the ciphertext to the POS terminal by the server, after the mutual authentication is passed further comprises:
    negotiating with the POS terminal to generate the session key by the server.

3. The method according to claim 2, wherein the certificate-to-be-upgraded comprises a new-root-certificate, a new-secondary-certificate and a new-tertiary-certificate, and said encapsulating the certificate-to-be-upgraded in the preset proprietary protocol format to obtain updated data, using the session key to encrypt the updated data to obtain the ciphertext and sending the ciphertext to the POS terminal by the server, after the mutual authentication is passed further comprises:
    by the server, encapsulating the new-root-certificate in the preset proprietary protocol format to obtain root-certificate-update-data, encrypting the root-certificate-update-data according to the session key to obtain a first ciphertext, and sending the first ciphertext to the POS terminal, after the mutual authentication is passed;

by the server, encapsulating, when receiving second success information returned by the POS terminal, the new-secondary-certificate in the preset proprietary protocol format to obtain secondary-certificate-update-data, encrypting the secondary-certificate-update-data according to the session key to obtain a second ciphertext, and sending the second ciphertext to the POS terminal; wherein the second success information is information returned by the POS terminal after the POS terminal decrypts the first ciphertext using the session key and extract the new-root-certificate from the first ciphertext; and by the server, encapsulating, when receiving third success information returned by the POS terminal, the new-tertiary-certificate in the preset proprietary protocol format to obtain tertiary-certificate-update-data, encrypting third ciphertext according to the session key to obtain a third ciphertext, sending the third ciphertext to the POS terminal, using the session key to decrypt the third ciphertext and extracting the new-tertiary-certificate from the third ciphertext by the POS terminal; wherein the third success information is information returned by the POS terminal after the POS terminal uses the session key to decrypt the second ciphertext and extracts the new-secondary-certificate from the second ciphertext, and successfully authenticates a signature of the new-secondary-certificate using a new-root-certificate public key.

4. A method for updating a certificate of a POS terminal implemented by the POS terminal, comprising:

sending a request for upgrading the certificate to a server and performing a mutual authentication with the server by the POS terminal; and receiving a ciphertext sent from the server, using a session key to decrypt the ciphertext to obtain updated data, extracting a certificate-to-be-upgraded from the updated data and replacing an old certificate with the certificate-to-be-upgraded by the POS terminal, after the mutual authentication is passed;

wherein said sending the request for upgrading the certificate to the server and performing the mutual authentication with the server by the POS terminal comprises:

sending the request for upgrading the certificate to the server, and receiving a server-secondary-certificate and a server-random-number from the server by the POS terminal; wherein the server-secondary-certificate and a POS-terminal-secondary-certificate are obtained by signing a root-certificate-private-key of a root certificate;

sending the POS-terminal-secondary-certificate, a POS-terminal-tertiary-certificate, a POS-terminal-random-number, and the server-random-number signed by a POS-terminal-tertiary-private-key to the server by the POS terminal;

receiving, by the POS terminal, the POS-terminal-random-number signed by a server-secondary-private-key and returned by the server, after the server has successfully authenticated a signature of the server-random-number signed by the POS-terminal-tertiary-private-key by using the POS-terminal-secondary-certificate and the POS-terminal-tertiary-certificate;

using the root certificate to authenticate a signature of the server-secondary-certificate to obtain a server-secondary-public-key by the POS terminal;

using the server-secondary-public-key to authenticate a signature of the POS-terminal-random-number signed by the server-secondary-private-key to obtain a verification result from the POS terminal, and determining whether the verification result from the POS terminal is consistent with the POS-terminal-random-number by the POS terminal; and sending first success information to the server to pass the mutual authentication by the POS terminal when the verification result from the POS terminal is consistent with the POS-terminal-random-number.

5. A non-transitory computer readable storage medium which stores a computer program, that, when being executed by a processor of a server, causes the processor to implement steps of a method for updating a certificate of a POS terminal, comprising:

performing a mutual authentication with the POS terminal when receiving a request for upgrading the certificate sent from the POS terminal; and encapsulating a certificate-to-be-upgraded in a preset proprietary protocol format to obtain updated data, using a session key to encrypt the updated data to obtain a ciphertext and sending the ciphertext to the POS terminal, after the mutual authentication is passed;

wherein said performing the mutual authentication with the POS terminal when receiving the request for upgrading the certificate sent from the POS terminal comprises:

sending a server-secondary-certificate and a server-random-number to the POS terminal when the request for upgrading the certificate sent from the POS terminal is received; wherein the server-secondary-certificate and a POS-terminal-secondary-certificate are obtained by signing a root-certificate-private-key of a root certificate; and receiving the POS-terminal-secondary-certificate, a POS-terminal-tertiary-certificate, a POS-terminal-random-number, and the server-random-number signed by a POS-terminal-tertiary-private-key from the POS terminal;

using the root certificate to authenticate a signature of the POS-terminal-secondary-certificate to obtain a POS-terminal-secondary-public-key, and using the POS-terminal-secondary-public-key to authenticate a signature of the POS-terminal-tertiary-certificate to obtain a POS-terminal-tertiary-public-key;

using the POS-terminal-tertiary-public-key to authenticate a signature of the server-random-number signed by a POS-terminal-tertiary-private-key to obtain a verification result from the server, and determining whether the verification result from the server is consistent with the server-random-number;

sending the POS-terminal-random-number signed by a server-secondary-private-key to the POS terminal, when the verification result from the server is consistent with the server-random-number; and passing the mutual authentication, when receiving first success information returned by the POS terminal after the POS terminal has successfully authenticated a signature of the POS-terminal-random-number signed by the server-secondary-private-key by using the server-secondary-certificate.

* * * * *